US006939818B2

(12) United States Patent
Draxöet al.

(10) Patent No.: US 6,939,818 B2
(45) Date of Patent: Sep. 6, 2005

(54) STRIPPABLE GLASS FIBER WALL COVERING

(75) Inventors: Krister Draxö, Helsingborg (SE); Per Edlund, Halmstad (SE); Torben Hernberg, Oskarström (SE)

(73) Assignee: Johns Manville International, Inc., Denver, CO (US)

( * ) Notice: Subject to any disclaimer, the term of this patent is extended or adjusted under 35 U.S.C. 154(b) by 246 days.

(21) Appl. No.: 09/827,855

(22) Filed: Apr. 6, 2001

(65) Prior Publication Data

US 2002/0081422 A1 Jun. 27, 2002

Related U.S. Application Data

(60) Provisional application No. 60/195,382, filed on Apr. 7, 2000.

(51) Int. Cl.[7] ............................ B05D 1/38; D04H 1/00; B32B 17/02; B32B 27/04; B32B 27/12

(52) U.S. Cl. ......................... 442/64; 428/343; 428/346; 428/347; 428/348; 428/904.4; 442/60; 442/61; 442/62; 442/63; 442/65; 442/66; 442/67; 442/180; 427/402; 427/407.1; 427/407.2; 427/407.3; 427/416

(58) Field of Search ............................ 442/60–67, 180; 428/343, 904.4, 347–348, 40.4, 41.8, 346; 427/402, 407.1, 407.2, 407.3, 416

(56) References Cited

U.S. PATENT DOCUMENTS

| | | | | | |
|---|---|---|---|---|---|
| 3,640,743 | A | * | 2/1972 | Sheehan | 106/428 |
| 3,934,066 | A | * | 1/1976 | Murch | 442/221 |
| 4,006,273 | A | | 2/1977 | Wolinski et al. | |
| 4,044,176 | A | | 8/1977 | Wolinski et al. | |
| 4,148,781 | A | * | 4/1979 | Narukawa et al. | 523/222 |
| 4,495,012 | A | | 1/1985 | Bérenger | |
| 4,783,354 | A | * | 11/1988 | Fagan | 428/40.5 |
| 4,902,722 | A | | 2/1990 | Melber | |
| 5,433,997 | A | | 7/1995 | Land | |
| 5,639,539 | A | * | 6/1997 | DeProspero et al. | 428/195.1 |
| 6,015,570 | A | * | 1/2000 | Tucci et al. | 424/403 |
| 6,200,404 | B1 | * | 3/2001 | Andersen et al. | 156/245 |
| 6,291,011 | B1 | | 9/2001 | Edlund | |
| 6,337,104 | B1 | | 1/2002 | Draxpö et al. | |
| 2001/0021616 | A1 | * | 9/2001 | Bullock et al. | 442/76 |

OTHER PUBLICATIONS

Description of ACRYSOL ASE–75, Rohm and Haas Company, 2000.*

"Nonwoven fabric", Complete Textile Glossary. Celanese Acetate, 2001.*

* cited by examiner

*Primary Examiner*—Ula Ruddock
*Assistant Examiner*—Jennifer Boyd
(74) *Attorney, Agent, or Firm*—Robert D. Touslee

(57) ABSTRACT

An improved strippable glass fiber wall covering and process for its formation are provided. Initially, both sides of a glass fiber fabric are coated with a first coating applied from an aqueous dispersion of starch binder and polymeric latex binder. In a preferred embodiment a cross-linking agent and pigment also are present in the first aqueous dispersion. Following the drying of such dispersion to form a first coating on both surfaces, a second dried coating is provided on one side only that serves as a separation layer. The second coating is applied from an aqueous dispersion comprising paraffin and a rheology modifier. When applied to the wall in conventional manner, the separation layer facilitates the removal of the wall covering with ease when its time of usefulness is concluded.

17 Claims, 1 Drawing Sheet

STRIPPABLE GLASS FIBER WALL COVERING

CROSS REFERENCE TO RELATED APPLICATION

Priority is claimed under 35 U.S.C. §119(e) for the filing of U.S. Provisional Application No. 60/195,382 on Apr. 7, 2000.

BACKGROUND

The benefits of using fiber glass wall coverings are well known. Fiber glass wall coverings offer fire resistance, easy and uncomplicated handling and flexibility in use. They also exhibit good abrasion resistance and appearance following painting. On the other hand, fiber glass wall coverings of the prior art require special glues or adhesives with strong binding forces and require cost-intensive and time consuming painting procedures. In addition, fiber glass wall coverings of the prior art cannot be removed without cost-intensive and time consuming procedures.

Typically, when redecorating a wall, the surface of the wall that is to receive the fiber glass wall covering must be filled with a filler and sanded at least twice to form a smooth surface. This method requires filler materials, equipment, and skill, and produces a dusty work environment.

A method to remove unwanted fiber glass wall coverings from the wall involves the application of chemicals. Such chemicals penetrate the paint and dissolve the glue. After that treatment the glass fiber fabric can be stripped from the wall. This method is also available while using a special glue/paint system that makes the stripping process somewhat easier. Both methods require chemicals, which are normally irritating to the skin, and create a wet and messy environment.

In the past, many attempts have been made to avoid the disadvantages of standard glass fabric adhesives, e.g., when removing the glass fabrics from the wall or when modifying the fabric surface, so as to reduce the complex and time consuming procedures for the end-user. International Publication No. WO 98 14 655 describes glass fiber wall coverings that utilize a thermoplastic adhesive. Thermoplastic adhesives require a special temperature treatment which necessitates the use of additional equipment. Such process is complicated and time consuming.

The necessary temperature treatment can be avoided when using a self-adhesive layer as the backing layer. DE 198 11 152 describes a painted or printed glass wall covering with a self-sticking backing. Such systems cannot be removed without the use of chemicals.

EP 0 909 850 describes a finished wall covering with a multicolor print and a self-adhesive backing. Such system can be removed from the wall. However, self-adhesive wall coverings are relatively expensive because they require additional production steps, e.g., one must cover the adhesive layer prior to use. In addition, the handling of such wall coverings when being attached to the wall is completely different from that employed with standard applications.

All "non-standard" systems mentioned above require special materials and equipment. The handling differs from standard papering procedures. Therefore it is much desired in the art to provide a strippable glass fiber fabric which retains the good aspects of fiber glass wall coverings, i.e., fire resistance, easy handling, flexibility, appearance, and abrasion resistance, and which can be used with standard gluing and painting materials such as are already being used with glass fiber wall coverings.

SUMMARY OF THE INVENTION

It is an object of the present invention to provide a fiber glass wall covering which can be easily removed from a substrate (e.g., a wall) without requiring any special treatment by the end-user or any special gluing or painting materials. The glass fabric has the same properties as standard glass fiber wall coverings, such as excellent fire resistance.

It is another object of the present invention to provide a process and a chemical formulation for the manufacture of a glass fiber fabric product so as to produce a strippable fiber glass wall covering.

According to a preferred embodiment of the present invention, a glass fiber fabric is produced by a process comprising the steps of providing a fiber glass fabric, applying a first chemical dispersion onto the fabric, and applying a second chemical treatment on the back side of the fabric to create a thin layer which acts as a separation layer when the wall covering is detached from the wall.

While the preferred embodiment of the present invention utilizes fiber glass fabrics in woven rolled form, other fiber glass fabrics such as a nonwoven mat also may be used.

Still other objects, features and attendant advantages of the present invention will become apparent to those skilled in the art upon reading the following detailed description of the preferred embodiments, together with the accompanying drawings.

DETAILED DESCRIPTION OF THE INVENTION

Figure 1:
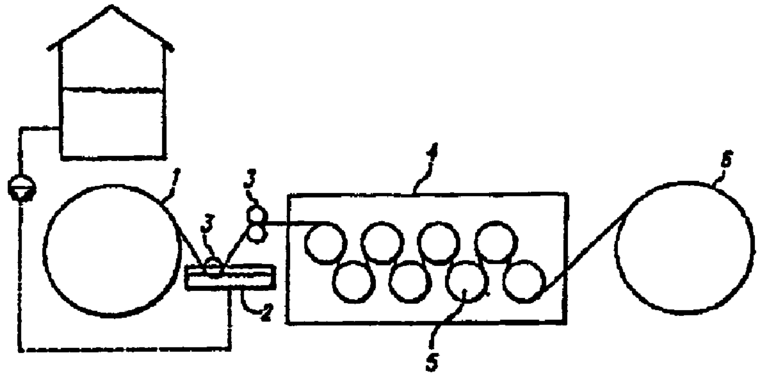
FIG. 1 depicts a preferred apparatus arrangement for applying a standard first chemical dispersion to both sides of the glass fabric.

FIG. 1 depicts a process for applying a first chemical treatment to a glass fabric, preferably the glass fabric is a woven product formed from fiber glass yarn. The weave of the fabric is typically a simple pattern of up to eight shafts. The fabric can be produced, for example, on Dornier weaving machines, Rapiers or Air-Jets, commonly in two or three meter widths. The fabric can be provided in roll form having a length of approximately 1,500 to 6,000 meters. Many fiber glass yarns may be selected for use when producing the woven materials for use in the present invention. Preferred yarns include for the warp direction continuous C-glass or E-glass of 9 to 10 microns, 139 to 142 tex with approximately 315 to 340 ends per meter. An alternative warp yarn is continuous C-glass or E-glass of 6 to 9 microns, 34 to 68 tex with approximately 680 ends per meter. For the weft direction, a preferred glass is discontinuous spun C-glass or E-glass, 8 to 11 microns, 165 to 550 tex with approximately 170 to 600 ends per meter. An alternative weft yarn includes continuous volumized or bulked E-glass or C-glass of 8 to 11 microns, 165 to 550 tex with approximately 170 to 600 ends per meter.

The present invention is also applicable to nonwoven glass fabrics, such as mat products. These can be produced, for example, by conventional wet-laid processes such as those described in U.S. Pat. Nos. 4,112,174; 4,681,802 and 4,810,576, the disclosures of which are incorporated herein by reference.

In the process of the present invention, the glass fabric 1, preferably provided in roll form, is fed to an impregnation bath 2, typically with the aid of through rollers 3 and conventional conveyance means to contact on both surfaces a bath of the chemical dispersion. Alternatively, for example, a transfer roll may convey the chemical mixture to at least one of the glass fabric surfaces. A preferred first aqueous chemical dispersion includes the components identified in Table 1 below where concentrations are provided on a weight basis.

TABLE 1

| | |
|---|---|
| Starch binder | 10 to 70% of dry substance. |
| Polymeric latex binder | 20 to 80% of dry substance. |
| Cross-linker | 0 to 15% of dry substance. |
| Pigments | 10 to 30% of dry substance. |

Alternatively to the rollers 3, rotary screens may be used to apply the chemicals to the glass fabric 1. The chemical mixture is supplied to the interior of the two rotating screens and is applied to the glass fabric by contact with the rotating screens.

Commercially available starch binders or CMCs (carboxymethyl cellulose) can be used. Starch binders derived from potatoes are preferred, but also corn can be used as a starch source. The polymeric latex binders are preferably copolymers of vinyl acetate and acrylics, e.g., ethylvinyl acetate and styrene acrylics. However, polyvinyl acetate (PVAc) or other polymeric latex binders can also be used.

Cross-linkers are agents that are reactive with functional groups located primarily on the polymeric latex binder. Cross-linkers preferably are used in a concentration of 3 to 12 percent on a dry basis to improve important characteristics such as film formation, hydrophobicity, wet strength, etc. These reactive agents can be either organic or inorganic types, e.g., based on zirconium, urea/formaldehyde or glyoxal derivatives. Zirconium cross-linking agents are preferred.

The preferred formulation is the most cost effective and technically functional.

The mixture is preferably water based, and has a dry substance percentage of between 5 and 20 weight percent, preferably between 10 and 12 weight percent, in the first chemical bath. Besides white pigments such as titanium dioxide, colored pigments can also be added or used to create colored fabrics as well.

Following the impregnation, the fabric may be conveyed to a drying oven 4, which in the preferred embodiment of FIG. 1 utilizes steam heated cylinders 5. After drying, the fabric can be cut into the desired width, and collected for the secondary treatment described hereafter. A fabric length of approximately 1,000 to 6,000 meters of treated fabric can be collected at batching strand 6. Alternatively, the subsequent application step wherein the second coating is applied can be carried out on a continuous basis.

This first impregnation step adds additional volume and opacity to the fabric. This leads to a pre-painted fabric which requires only one single painting step by the end-user. The time consuming second painting which is usually necessary for glass fabrics can be omitted.

Figure 2:
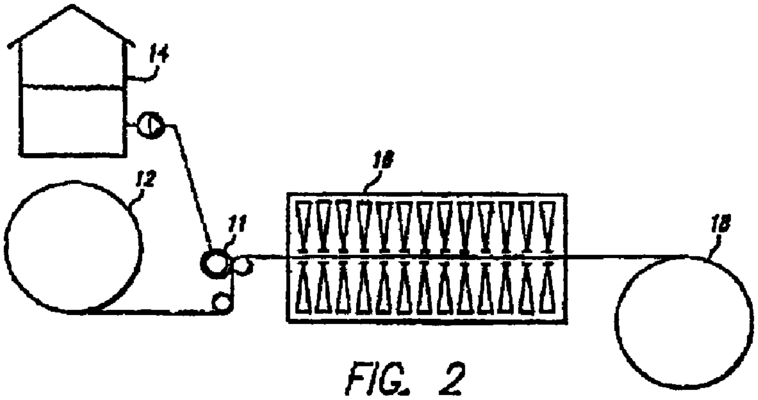
FIG. 2 depicts the process for applying the second chemical dispersion to one side of the glass fabric in a preferred application technique using a rotating screen.

In FIG. 2, a preferred method of applying the separation layer to the fabric is shown. Such application to one side only is on top of the previously dried first coating. A rotating screen 11, such as available from Stork, may be used to next apply the second coating to the glass fabric 12. The chemical dispersion from 14 is supplied to the interior of the rotating screen 11. The dispersion is applied to the glass fabric by contact with the rotating screen. The chemical dispersion can also be applied by a transfer roller without any drawbacks.

A preferred aqueous chemical dispersion for the second coating includes the components set out in Table 2 below where concentrations are provided on a weight basis.

TABLE 2

| | |
|---|---|
| Paraffin dispersion | 80 to 99% of dry substance. |
| Rheology modifier (thickener) | 1 to 20% of dry substance. |

Preferably, the paraffin dispersion is free of metal salts. The paraffin dispersion preferably is ethylene paraffin wax having molecule chain lengths of approximately C 20 to 34. The aqueous dispersion typically contains up to 40 percent paraffin and may include conventional stabilizing agents. A rheology modifier (thickener) is used to stabilize and enhance the processability of the paraffin wax dispersion resulting in the formation of the separation layer on the reverse side of the glass fabric. Rheology modifiers can be selected from the known groups of acrylic thickeners, polyurethane thickeners, cellulose thickeners, etc.

Typically, 10 to 60 grams of the dispersion per square meter is sufficient to obtain an optimum adhesion strength combined with a moderate tear force. The wanted tear force can be adjusted by the quantity of the applied dispersion. It also is influenced by the type and structure of the glass fabric. The optimum adhesion strength is necessary to obtain the same wear resistance and the same fire resistance as a standard glass fiber wall covering.

Following the application of the dispersion to the fabric surface, the fabric may be conveyed to a drying means, which in the preferred embodiment of FIG. 2 is depicted as air drier 16. Alternatively, heated cylinders can be used to advantage. After drying, fabric can be cut into desired width, and collected for subsequent treatment, for example, into rolls at a batching stand 18 having a length between approximately 1,000 and 6,000 meters.

The product of the process described above is typically supplied to an end user in roll form, for application to a wall of other interior structures. Conventional types of glues and paints which are used with standard fiber glass wall coverings can be applied to the product of the present invention. The product has the same fire resistance rating as standard fiber glass fabrics.

The wall covering of the present invention can be easily removed from the wall when its service time is concluded. The novel product can be simply lifted from the wall a few centimeters by the use of a knife or similar tool and then pulled or stripped by hand from the wall. Force applied by hand can be used to remove the wall covering.

EXAMPLE

A glass woven fabric consisting of 139 tex texturized warp yarns with 315 yarns per meter and 250 tex texturized glass staple fiber yarns with 200 yarns per meter is produced and is coated and impregnated on both sides with a first aqueous dispersion comprising 25 percent of potato starch, 47 percent of an acrylic latex binder, 6 percent of a zirconium cross-linker, and 22 percent of a white titanium oxide pigment on a dry basis.

After drying to form a first dried coating, a second aqueous chemical dispersion is applied on one side only using a rotary screen applicator. The second dispersion contains 95 percent paraffin wax and 5 percent acrylic thickener as a rheology modifier on a dry basis. The second coating also is dried to yield a layer which is capable of aiding in the removal of the resulting wall covering from a wall.

Although the invention has been described with a preferred embodiment, it is to be understood that variations and modifications may be resorted to as will be apparent to those skilled in the art. Such variations and modifications are to be considered within the purview and scope of the claims appended hereto.

We claim:

1. A strippable glass fiber wall covering comprising a glass fiber fabric impregnated and coated on both sides with a first dried coating comprising a starch and a polymeric latex binder and having applied thereon a second dried coating to only one of the coated sides, whereby the second dried coating consists essentially of a paraffin wax and a rheology modifier and serves as a separation layer that facilitates the removal of said wall covering from a substrate wherein the starch is present in an amount ranging from about 10 to 70% by wt. and the polymeric latex binder is present in an amount ranging from about 20 to 80% by wt., based on the dried weight of the first coating, and wherein the paraffin wax is present in an amount ranging from about 80 to 99% by wt. and the rheology modifier is present in an amount ranging from about 1 to 2-0% by wt., based on the dried weight of the second coating.

2. The wall covering according to claim 1, wherein the rheology modifier is an acrylic thickener, a polyurethane thickener or a cellulose thickener.

3. A wall covering according to claim 1, wherein said glass fiber fabric is a woven fabric.

4. A wall covering according to claim 1, wherein said glass fiber fabric is a nonwoven.

5. A wall covering according to claim 1, wherein said starch component of the first dried coating is potato starch.

6. A wall covering according to claim 1, wherein said polymeric latex binder component of the first dried coating is an acrylic latex binder.

7. A wall covering according to claim 1, wherein said first dried coating includes a cross-linking agent.

8. A wall covering according to claim 1, wherein said cross-linking agent of the first dried coating is a zirconium cross-linker.

9. A wall covering according to claim 1, wherein said first dried coating additionally includes pigment.

10. A wall covering according to claim 1, wherein said pigment of the first dried coating is titanium dioxide.

11. A process for forming the strippable glass fiber wall covering according to claim 1, said process comprising:

(a) providing a glass fiber fabric, (b) forming a first dried coating on both sides of said glass fiber fabric that is applied from an aqueous dispersion comprising a starch and a polymeric latex binder, and (c) subsequently forming a second dried coating on said first dried coating on one side only of said glass fiber fabric that is applied from an aqueous dispersion consisting essentially of a paraffin wax and a rheology modifier with said second dried coating being capable of aiding in the removal of the wall covering from the wall.

12. A process according to claim 1, wherein the glass fiber fabric is supplied in roll form.

13. A process according to claim 1 wherein the aqueous dispersions of said first and second dried coatings are applied on a continuous process.

14. The process of claim 1 wherein the drying of the glass fiber fabric in steps (b) and (c) is accomplished through the use of drying cylinders.

15. The process of claim 1 wherein the drying of the glass fiber fabric in steps (b) and (c) is accomplished in air driers.

16. The process of claim 1 wherein the application of said aqueous dispersions in steps (b) and (c) is accomplished through the use of a rotating screen applicator.

17. The process of claim 1 wherein the applying of said aqueous dispersions in steps (b) and (c) is accomplished through the use of transfer rollers.

* * * * *